UNITED STATES PATENT OFFICE.

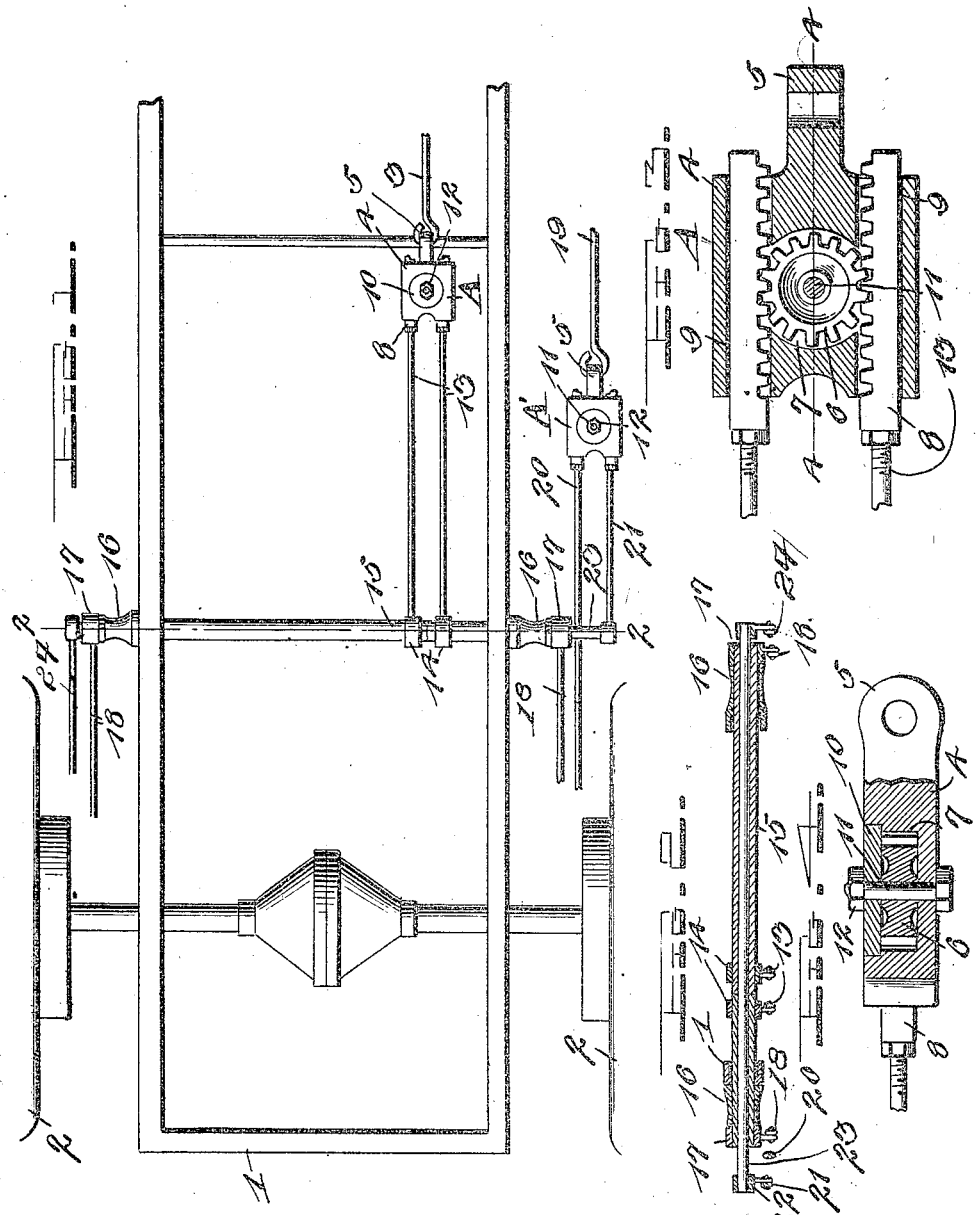

NILS W. KAUNITZ, OF HOQUIAM, WASHINGTON.

BRAKE-EQUALIZER.

1,055,471.

Specification of Letters Patent.

Patented Mar. 11, 1913.

Application filed March 25, 1912. Serial No. 686,052.

*To all whom it may concern:*

Be it known that I, NILS W. KAUNITZ, a subject of the King of Sweden, residing at Hoquiam, in the county of Chehalis and State of Washington, have invented certain new and useful Improvements in Brake-Equalizers, of which the following is a specification, reference being had to the accompanying drawings.

This invention relates to vehicle brakes and particularly to automobile brakes wherein brake bands or shoes operate on wheels on opposite sides of the vehicle, and an object of this invention is to provide an equalizing device for the brake members which will permit an equal and positive pressure to the members, and operate them simultaneously, even though the adjustment of the leverage of the members may not be the same.

With this and other objects in view, the invention comprises certain features of construction which will be hereinafter more fully described and which are illustrated in the accompanying drawings, in which, Figure 1 is a plan view of the equalizing member showing it secured to the frame of a vehicle. Fig. 2 is a section taken on the line 2—2, of Fig. 1. Fig. 3 is a detail section of the equalizing member, and, Fig. 4 is a section taken on the line 4—4, of Fig. 3.

Referring to the drawings by characters of reference, the numeral 1 designates the frame of a vehicle, of which 2 are the drive wheels. A lever 3 is secured to the vehicle near the front portion thereof, one end of which is pivotally secured to a brake operating lever (not shown) and the opposite end thereof secured to the equalizing member which is generally designated by the letter A. The equalizing member comprises a reciprocatory frame 4 having an apertured extension 5 on one end thereof, in which the lever 3 is secured. This frame 4 serves to support a rotatably mounted spur wheel 6 which rests in a seat 7, and two slidably mounted rack bars 8 which are supported on opposite sides of the wheel 6 in guideways 9, are adapted to mesh with the spur wheel 6. This wheel is held in position in the frame by means of a washer 10 which is secured to the frame by means of a bolt 11 and nut 12, the bolt 11 also providing an axle for the wheel to revolve upon. Secured to the rack bars 8, are rods 13 which are pivotally connected to collars 14 which are secured to a hollow shaft 15 which is in two sections working independently of each other. The opposite ends of the hollow shaft members 15 extend through the frame of the vehicle and rotate in bearings 16 having collars 17 secured to their extremities which are connected to rods 18 which lead to the contracting brake bands (not shown).

A duplicate equalizing member A' is supported on one side of the frame of the vehicle, one end of which is secured to a rod 19 leading to an emergency brake lever (not shown) and having one of the rack bars 8 secured to a rod 20 which leads directly to an expanding brake band (not shown). The other rack bar 8 is connected to a rod 21 which is pivotally secured to a collar 22 which is mounted on a shaft 23 which extends through the hollow shaft 15 where it is pivotally secured to a rod 24 which leads to a corresponding expanding brake band (not shown).

The operation of my device is as follows: When power is applied to either or both of the brake operating levers, the equalizing frame is reciprocated and the power is transmitted therefrom to the brakes. Should the connections to the brakes have the same tension, the spur wheel will not rotate when power is applied, but should the levers of one of the connections be loose, the wheel will rotate and take up the slack on the rack that is loose and pay it out on the other, thereby equalizing the tension of the rod and applying the power to both brakes simultaneously.

Having thus described my invention what I claim and desire to secure by Letters Patent is:—

In a brake equalizer, a reciprocatory frame having an apertured extension on one end, a brake operating lever secured in the apertured extension, a spur wheel revolubly mounted in a seat in said frame, a plate adapted to cover said seat, said frame formed with longitudinal channels on the opposite sides of the said seat, rack bars connected at one end to the brakes and the other ends thereof slidably mounted in the channels in the frame and meshing with the spur wheel, and a bolt adapted to secure the said cover plate to the frame and also providing an axle for the spur wheel to revolve upon.

In testimony whereof I hereunto affix my signature in the presence of two witnesses.

NILS W. KAUNITZ.

Witnesses:
ALTON R. KELLOGG,
WILLIAM L. MCNAIR.